(12) United States Patent
Okada (10) Patent No.: US 8,320,853 B2
(45) Date of Patent: Nov. 27, 2012

(54) RADIO COMMUNICATION DEVICE AND TRANSMISSION POWER MEASUREMENT METHOD OF RADIO COMMUNICATION DEVICE

(75) Inventor: Kengo Okada, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 339 days.

(21) Appl. No.: 12/728,784

(22) Filed: Mar. 22, 2010

(65) Prior Publication Data

US 2010/0240324 A1 Sep. 23, 2010

(30) Foreign Application Priority Data

Mar. 23, 2009 (JP) ................. 2009-069832

(51) Int. Cl.
*H01Q 11/12* (2006.01)
*H04B 1/40* (2006.01)
*H04B 1/44* (2006.01)
*H04B 17/00* (2006.01)
*H04B 1/38* (2006.01)

(52) U.S. Cl. ... 455/127.1; 455/75; 455/41.1; 455/67.13; 455/78; 455/127.5; 455/572; 455/574

(58) Field of Classification Search .............. 455/75, 455/127.1
See application file for complete search history.

(56) References Cited

U.S. PATENT DOCUMENTS

| 6,236,840 B1 | 5/2001 | Aihara et al. | |
| 2006/0229041 A1 * | 10/2006 | Ninomiya et al. | 455/196.1 |
| 2008/0039045 A1 * | 2/2008 | Filipovic et al. | 455/295 |
| 2008/0225932 A1 * | 9/2008 | Fukuda | 375/216 |
| 2008/0233894 A1 * | 9/2008 | Aparin | 455/78 |

FOREIGN PATENT DOCUMENTS

| JP | 61-163729 | 7/1986 |
| JP | 63-138807 A | 6/1988 |
| JP | 4-372227 A | 12/1992 |
| JP | 10-22757 A | 1/1998 |
| JP | 10-173547 A | 6/1998 |
| JP | 10-285058 A | 10/1998 |
| JP | 2001-223607 A | 8/2001 |
| JP | 2003-332918 A | 11/2003 |
| JP | 2004-80290 A | 3/2004 |

* cited by examiner

*Primary Examiner* — Temesgh Ghebretinsae
*Assistant Examiner* — Devan Sandiford
(74) *Attorney, Agent, or Firm* — Foley & Lardner LLP (57) ABSTRACT

A radio communication device includes a radio transmitting unit that generates a transmission signal containing a transmission carrier, a radio receiving unit including a frequency conversion circuit that performs down-conversion of a received signal containing a received carrier with substantially equal frequency to the transmission carrier, a transmission/reception separating circuit including a first port connected to the radio transmitting unit, a second port to the radio receiving unit and a third port to an antenna, that outputs the transmission signal into the first port to the third port and the received signal into the third port to the second port, and a transmission power control unit that performs control related to a transmission power of the transmission signal based on a low-frequency signal obtained by supplying a leakage component of the transmission signal leaking from the first port to the second port to the frequency conversion circuit and down-converting it.

11 Claims, 5 Drawing Sheets

RADIO COMMUNICATION DEVICE AND TRANSMISSION POWER MEASUREMENT METHOD OF RADIO COMMUNICATION DEVICE

INCORPORATION BY REFERENCE

This application is based upon and claims the benefit of priority from Japanese patent application No. 2009-069832, filed on Mar. 23, 2009, the disclosure of which is incorporated herein in its entirety by reference.

BACKGROUND

1. Field of the Invention

The present invention relates to a radio communication device and, particularly, to a radio communication device with a time division duplex (TDD) scheme using the same carrier frequency for transmission and reception, such as a passive radio frequency identification (RFID) reader device.

2. Description of Related Art

In a passive RFID system, a radio tag operates by using a radio wave transmitted from a reader device as a power. For example, a passive radio tag generates an ASK-modulated reflected wave by changing impedance based on identification information unique to the radio tag when reflecting a non-modulated carrier transmitted from a reader device. The modulated reflected wave is called a backscattered signal. The reader device receives the backscattered signal as a response from the radio tag. In this manner, the passive RFID system adopts a time division duplex (TDD) scheme that uses the same carrier frequency for transmission and reception. In addition, the reader device in the passive RFID system continuously transmits a non-modulated carrier which is necessary for generation of a backscattered signal while the radio tag is transmitting a radio signal (a backscattered signal).

A frequency band available for radio communication and its maximum power are regulated by law or the like in each country. Further, suppression of a transmission power of a radio communication device contributes to reduction of power consumption. Therefore, a general radio communication device includes a circuit that measures a transmission power and a mechanism that makes control related to a transmission power based on a measurement result (cf. e.g. Japanese Unexamined Patent Application Publications Nos. 2003-332918, 2004-80290, 10-285058, 10-22757, 04-372227, 63-138807, and 61-163729). There are various ways of control related to a transmission power. Illustrative examples of control related to a transmission power includes (a) conforming that a transmission power is within an allowable range by a measured value of the transmission power, (b) adjusting the gain of a transmission signal in such a way that a transmission power becomes closer to a desired value, (c) stopping transmission output upon detecting the anomaly of a transmission power, and so on.

SUMMARY

In radio communication devices according to related art as disclosed in the above-described patent documents, a circuit for measuring a transmission power of its own device is placed separately from a receiving circuit for demodulating a radio signal received from the other end of communication, which raises a problem that a circuit configuration is redundant.

A first exemplary aspect of the present invention is a radio communication device that includes a radio transmitting unit, a radio receiving unit, a transmission/reception separating circuit and a transmission power control unit. The radio transmitting unit generates a transmission signal containing a transmission carrier. The radio receiving unit includes a frequency conversion circuit that performs frequency down-conversion of a received signal containing a received carrier with substantially the same frequency as the transmission carrier. The transmission/reception separating circuit includes a first port connected to the radio transmitting unit, a second port connected to the radio receiving unit and a third port connected to an antenna. The transmission/reception separating circuit outputs the transmission signal input into the first port to the third port and outputs the received signal input into the third port to the second port. The transmission power control unit performs control related to a transmission power of the transmission signal based on a low-frequency signal obtained by supplying a leakage component of the transmission signal leaking from the first port to the second port to the frequency conversion circuit and down-converting the leakage component.

A second exemplary aspect of the present invention is a transmission power measurement method of a radio communication device. The method includes the following two steps (a) and (b): (a) supplying a leakage component of a transmission signal, leaking from a radio transmitting unit side to a radio receiving unit side through a transmission/reception separating circuit placed among (i) a radio transmitting unit that performs modulation of the transmission signal, (ii) a radio receiving unit that performs frequency down-conversion of a received signal containing a received carrier with substantially the same frequency as a transmission carrier contained in the transmission signal, and (iii) an antenna that is used both for transmission of the transmission signal and reception of the received signal, to the radio receiving unit and performing frequency down-conversion of the leakage component; and (b) acquiring a measured value related to a transmission power of the transmission signal based on a low-frequency signal obtained by frequency down-conversion of the leakage component.

According to the exemplary aspects of the present invention described above, measurement of the transmission power of the radio transmitting unit and control of the transmission power can be made by using a block that performs frequency down-conversion in the radio receiving unit. It is thus not necessary to separately place a circuit that performs down-conversion of the transmission signal transmitted from the radio transmitting unit, thereby enabling reduction of a circuit scale for measuring a transmission power of its own device.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments of the present invention will be described hereinafter in detail with reference to the drawings. In the drawings, the identical reference symbols denote identical structural elements and the redundant explanation thereof is omitted as appropriate.

First Exemplary Embodiment

A radio communication device 1 according to a first exemplary embodiment of the present invention is applicable to an RFID reader that reads data from a passive radio tag or an RFID reader/writer that further writes data to a radio tag. When reading data from a radio tag, the radio communication device 1 transmits a modulated signal containing a read command. Further, during a transmission period in a radio tag which is implemented in response to the read command, the radio communication device 1 transmits a non-modulated signal that is necessary for generation of a backscattered signal and receives a backscattered signal from the radio tag.

Figure 1:
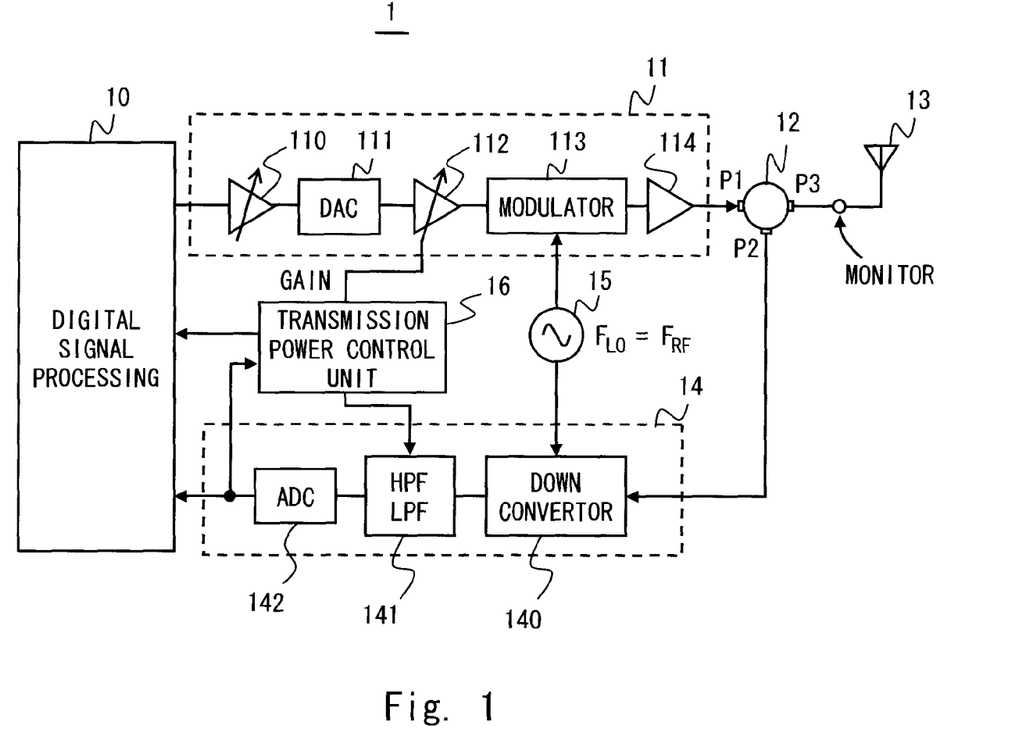
FIG. 1 is a block diagram showing a configuration of a radio communication device according to a first exemplary embodiment of the present invention.

FIG. 1 is a block diagram showing an exemplary configuration of the radio communication device 1. The exemplary configuration in FIG. 1 employs the direct conversion architecture for both transmission and reception. Thus, an oscillation frequency $F_{LO}$ of a local oscillator 15 and a carrier frequency $F_{RF}$ of a transmission signal and a received signal are the same.

In FIG. 1, a digital signal processing circuit 10 performs control of communication with a radio tag, generation of a transmission symbol sequence (digital transmission baseband signal) to be supplied to a radio transmitting unit 11, which is described later, and analysis of a digitized received signal supplied from a radio receiving unit 14. The processing of generating a digital transmission baseband signal includes (i) acquisition of a transmission data sequence containing a command and write data to a radio tag (in the case of a writer), (ii) redundant coding of a transmission data sequence, (iii) line coding by non-return-zero (NRZ) coding or Manchester coding, (iv) mapping that converts a preamble and a coded transmission data sequence into a symbol sequence and so on. The redundant coding, line coding and mapping are performed according to need for the purposes of securing communication quality, ensuring compliance with communication standards and so on. Further, the analysis of a received signal in the digital signal processing circuit 10 includes reconstitution of transmitted data (e.g. the identification information) from a radio tag by performing demodulation, de-interleaving and decoding.

The digital signal processing circuit 10 is constructed by a combination of a microcontroller and a digital signal processor (DSP) or the like. In some cases, the digital signal processing circuit 10 is constructed as a one-chip integrated circuit (IC) that is generally called a baseband IC, a baseband unit or the like.

A radio transmitting unit 11 generates a transmission signal (i.e. a modulated signal) containing a transmission carrier that is modulated by a transmission symbol sequence (i.e. a transmission baseband signal) or a transmission signal containing a transmission carrier that is not modulated (i.e. a non-modulated signal). The generated transmission signal is supplied to an antenna 13 through a transmission/reception separating circuit 12 and sent out to a radio tag. The radio transmitting unit 11 has D/A conversion function, modulation function, up-conversion function, and amplification function. Because the example of FIG. 1 employs the direct conversion architecture, modulation and up-conversion of a local oscillation signal are performed simultaneously.

A digital variable gain amplifier 110 adjusts the amplitude level of the digital transmission baseband signal. A D/A converter (DAC) 111 converts the digital transmission baseband signal into an analog signal. An analog variable gain amplifier 112 adjusts the amplitude of the output signal from the DAC 111. A modulator 113 modulates a frequency carrier (frequency $F_{RF}$) supplied from a local oscillator 15 by the transmission baseband signal and generates a transmission signal in RF band. If there is no transmission baseband signal, a transmission baseband signal containing a non-modulated transmission carrier is generated. A power amplifier 114 amplifies the transmission signal in RF band and supplies the amplified signal to the transmission/reception separating circuit 12.

The configuration of the radio transmitting unit 11 shown in FIG. 1 is just by way of illustration, and various other transmitter architectures exist. Those skilled in the art will be able to construct the radio transmitting unit 11 having D/A conversion function, modulation function, up-conversion function and amplification function as appropriate with use of the exemplary configuration of FIG. 1 and known art.

The transmission/reception separating circuit 12 has a function of separating a transmission signal and a received signal. Specifically, the transmission/reception separating circuit 12 outputs the transmission signal, which is input into a first port P1 from the radio transmitting unit 11, to a third port P3 connected to the antenna 13. Further, the transmission/reception separating circuit 12 outputs the received signal (e.g. the backscattered signal) from the radio tag, which is input into the third port P3 from the antenna 13, to a second port P2 connected to the radio receiving unit 14.

As described earlier, in a passive RFID reader (reader/writer), a transmission carrier is the same with a received carrier, and transmission of a non-modulated signal and reception of a backscattered signal from a radio tag need to be performed simultaneously in parallel. It is thus difficult to use a duplexer in which bandpass filters with different pass bands are placed respectively at a radio transmitting unit and a radio receiving unit, which is typically used in a frequency division duplex (FDD) system, as the transmission/reception separating circuit 12. It is also difficult to use a high-frequency switch that temporally switches a connection destination of a shared antenna between a radio transmitting unit and a radio receiving unit, which is typically used in a normal TDD system, as the transmission/reception separating circuit 12. Thus, it is preferred to use a directional coupler or a circulator, for example, as the transmission/reception separating circuit 12 which is incorporated into a passive RFID reader (reader/writer).

The radio receiving unit 14 down-converts the frequency of a received signal (backscattered signal) that reaches the antenna 13 from a radio tag and then converts it into a digital signal. In the example of FIG. 1, the radio receiving unit 14 includes a down converter 140, a filtering circuit 141 and an A/D converter (ADC) 142. The down converter 140 down-converts a received signal into the baseband. The filtering circuit 141 includes a low-pass filter (LPF) and a high-pass filter (HPF). The LPF is a filter that removes a high-frequency component and selects the baseband. On the other hand, the HPF is a filter that cuts off the frequency around 0 Hz and removes a DC offset caused by self-mixing in the down converter 140. The ADC 142 samples an analog signal that has passed through the filtering circuit 141 and converts it into a digital signal.

The radio receiving unit 14 of the exemplary embodiment performs frequency down-conversion and A/D conversion of a leakage component of the transmission signal which leaks from the radio transmitting unit 11 to the radio receiving unit 14 through the transmission/reception separating circuit 12, in addition to frequency down-conversion and A/D conversion of the received signal received from the radio tag. A low-frequency signal obtained by down-converting the leakage component of the transmission signal is referred to hereinafter as "transmission leakage signal". The transmission leakage signal that is digitized by the radio receiving unit 14 is supplied to a transmission power control unit 16, which is described below.

The transmission power control unit 16 detects the power level of the transmission leakage signal digitized by the radio receiving unit 14. The energy level of the transmission leakage signal which is measured in the transmission power control unit 16 reflects the level of the transmission power of the transmission signal in the radio transmitting unit 11. Accordingly, the power level of the transmission leakage signal measured in the transmission power control unit 16 becomes higher as the transmission power by the radio transmitting unit 11 becomes higher.

The transmission power control unit 16 controls the transmission power by the radio transmitting unit 11 based on a measurement result of the power level of the transmission leakage signal. There are various ways of control of the transmission power. For example, the transmission power control unit 16 may confirm that the transmission power is within an allowable range by a measured value of the transmission power. Further, the transmission power control unit 16 may adjust the gain of the transmission signal in such a way that the transmission power becomes closer to a desired value by using the power level of the transmission leakage signal as an index. In this case, the gain control of the transmission signal may be made based on the correspondence between the power level of the transmission signal emitted from the antenna 13 and the power level of the transmission leakage signal. The correspondence may be obtained in advance in initial calibration of the radio communication device 1. Further, the transmission power control unit 16 may reduce the transmission power upon detecting the anomaly of the transmission power by the power level of the transmission leakage signal.

The measurement of the power level of the transmission leakage signal by the transmission power control unit 16 needs to be performed during a period when there is no backscattered signal from a radio tag. It is thus preferred to perform the measurement of the power level of the transmission leakage signal while transmitting a non-modulated signal after stopping transmission of a modulated signal containing a read command or the like to a radio tag. However, there is the following problem in the case of measuring the power level of the transmission leakage signal while transmitting a non-modulated signal. The radio receiving unit 14 in the direct conversion architecture includes a HPF (filtering circuit 141) that is placed on the path of a received signal for the purpose of DC offset removal. On the other hand, almost all of the energy of the transmission leakage signal (leakage component of a non-modulated signal) that is converted to the baseband by direct conversion exit near DC (around 0 Hz). Thus, the transmission leakage signal is blocked by the HPF in the filtering circuit 141, which makes it difficult to detect the transmission leakage signal in the ADC 142.

To address the above problem, the transmission power control unit 16 preferably controls the filtering circuit 141 so as to bypass the HPF at the time of measuring the power level of the transmission leakage signal. Further, in some configuration of a receiver which is different from that of the radio receiving unit 14 in FIG. 1, a digital filter is used for DC offset removal. In this case, the transmission power control unit 16 preferably controls the digital filter so as to stop update of a filter coefficient for DC offset canceling and converge it to a given value. This allows DC offset removal in the radio receiving unit 14 to be stopped temporarily, which enables use of the radio receiving unit 14 also for the measurement of the leakage component (transmission leakage component) of a non-modulated transmission signal.

Figure 2:
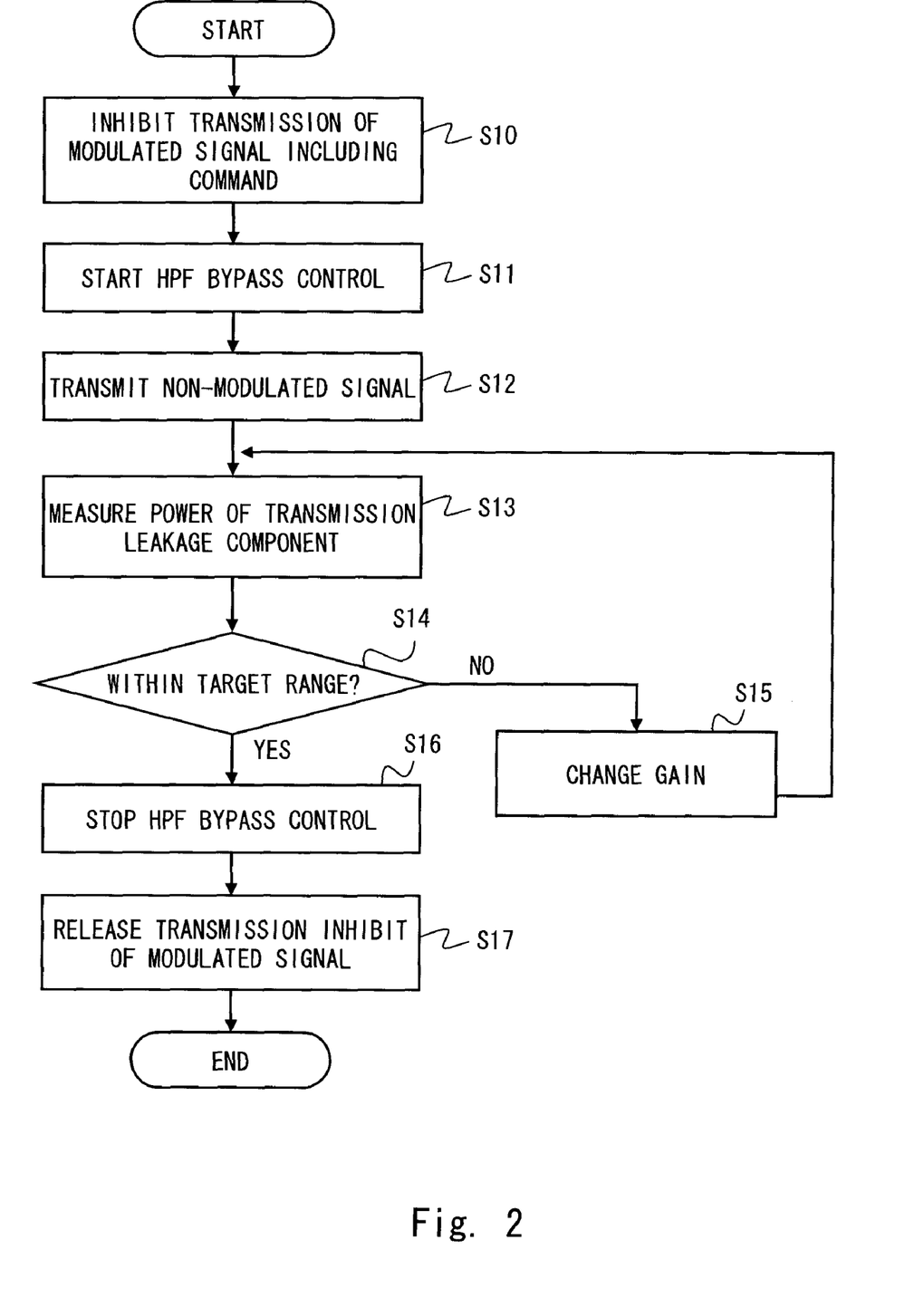
FIG. 2 is a flowchart showing an example of transmission power control.

An illustrative example of transmission power control by the transmission power control unit 16 is described hereinafter with reference to FIG. 2. The flowchart in FIG. 2 shows an example of adjusting the gain of the amplifier in the radio transmitting unit 11 by using a measured value of the power level of the transmission leakage component as an index.

In step S11, the transmission power control unit 16 directs the digital signal processing circuit 10 and the radio transmitting unit 11 to inhibit transmission of a modulated signal containing a command to a radio tag. In step S12, the transmission power control unit 16 activates the bypass of the HPF in the filtering circuit 141. In step S13, the transmission power control unit 16 directs the digital signal processing circuit 10 and the radio transmitting unit 11 to transmit a non-modulated signal.

Steps S13 to S15 are the process of gain control using a power level measured value of the transmission leakage component. In step S13, the power level of the transmission leakage signal is measured. In step S14, it is determined whether the power level measured value of the transmission leakage signal is within a target range or not. If the power level measured value of the transmission leakage signal is outside the target range (NO in S14), the transmission power control unit 16 changes the gain of the amplifier in the radio transmitting unit 11. Although the transmission power control unit 16 controls the gain of the analog variable gain amplifier 112 in the example of FIG. 1, it may control the digital variable gain amplifier 110 or control the RF power amplifier 114 instead or in combination therewith.

If, on the other hand, the power level measured value of the transmission leakage signal is converged within the target range (YES in S14), the transmission power control unit 16 stops the bypass of the HPF in the filtering circuit 141 and releases the transmission inhibit of a modulated signal (steps S16 and S17).

As described above, in order to make transmission power control by using the power level measured value of the transmission leakage signal as an index, initial calibration may be performed at the time of delivery inspection of a device, for example. This also enables compensation of variations in the characteristics of the radio transmitting unit 11, the transmission/reception separating circuit 12 and the radio receiving unit 14. Further, by performing initial calibration, the radio communication device 1 can make control of a transmission power independently after the operation of an RFID reader incorporating the radio communication device 1 is started. Specifically, initial calibration may be performed by the following steps (1) to (6):

(1) connect a calibrated power meter (spectrum analyzer etc.) to a monitor point (MONITOR in FIG. 1) on the third port P3 side of the transmission/reception separating circuit 12;

(2) set the HPF in the filtering circuit 141 to bypass mode or stop DC blocking operation;

(3) direct the radio transmitting unit 11 to transmit a non-modulated signal;

(4) perform measurement while changing the transmission power of the non-modulated signal, and store a power measured value of the transmission leakage signal and a gain set value at the time when a transmission power measured value at the monitor point becomes a specified value;

(5) perform the operation of the above step (4) on a plurality of transmission power values necessary and obtain power measured values of the transmission leakage signal and gain set values; and (6) create a look-up table describing the correspondence among the transmission power of the non-modulated signal, the power measured value of the transmission leakage signal and the gain set value, and store it into memory (not shown) in the transmission power control unit 16.

As described above, the radio communication device 1 according to the exemplary embodiment uses the radio receiving unit 14 for the measurement of the transmission power of the radio transmitting unit 11. It is thereby possible to suppress the circuit scale necessary for measuring the transmission power of the radio transmitting unit 11.

In the above exemplary embodiment, the example in which the transmission power control unit 16 is placed separately from the digital signal processing circuit 10 is described. However, transmission power control may be performed in a baseband IC or the like that is common to the digital signal processing circuit 10. Such an alternative example is described in a second exemplary embodiment below.

Further, in the above exemplary embodiment, the example in which the down converter 140 and the ADC 142 are used both for reception of a backscattered signal and measurement of a transmission leakage signal power is described. However, only the down converter 140 may be used both for those. Such an alternative example is described in a third exemplary embodiment below.

Further, in the above exemplary embodiment, the example in which the radio receiving unit 14 performs direct conversion reception is described. However, the radio receiving unit 14 may perform heterodyne reception that converts a backscattered signal into the IF band. Such an alternative example is described in a fourth exemplary embodiment below.

Second Exemplary Embodiment

Figure 3:
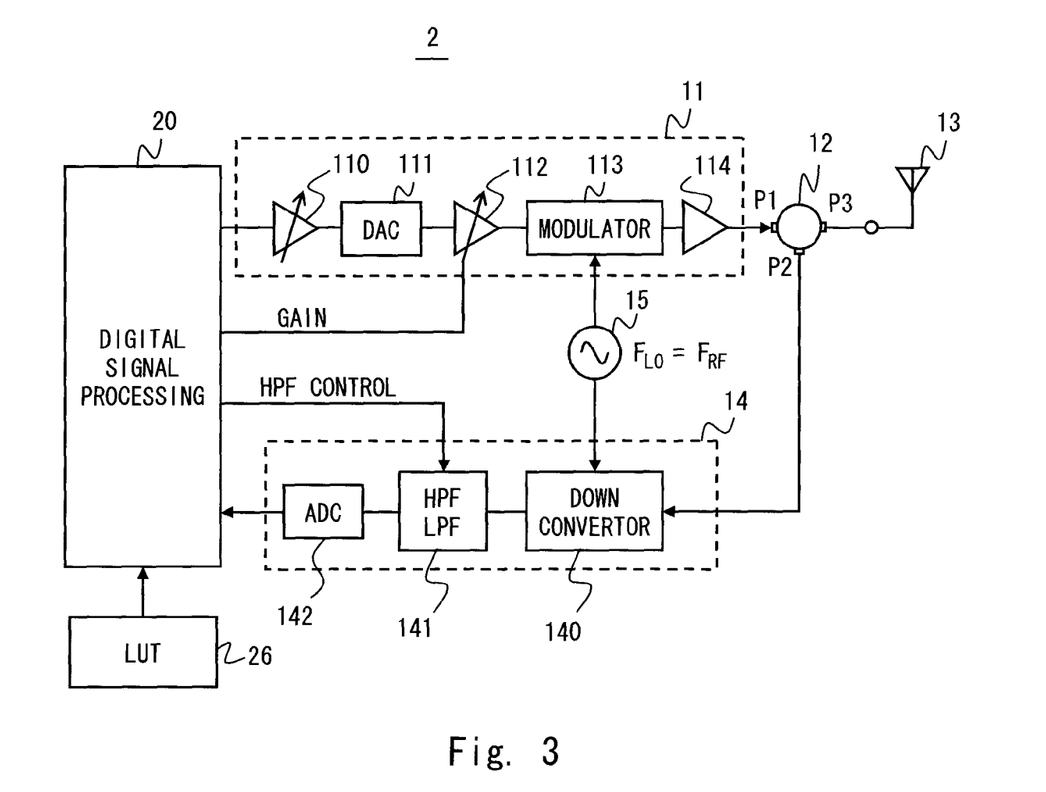
FIG. 3 is a block diagram showing a configuration of a radio communication device according to a second exemplary embodiment of the present invention.

FIG. 3 is a block diagram showing an exemplary configuration of a radio communication device 2 according to the second exemplary embodiment. A digital signal processing circuit 20 in FIG. 3 performs control of communication with the other end of communication (radio tag), generation of a transmission symbol sequence, and analysis of a received backscattered signal, just like the digital signal processing circuit 10 described above. Further, the digital signal processing circuit 20 performs transmission power control using power level measurement of a transmission leakage signal by referring to a look-up table 26. The look-up table 26 may contain description about the correspondence between a transmission power of a non-modulated signal and a power measured value of a transmission leakage signal. In addition, the correspondence between a transmission power of a non-modulated signal and a gain set value may be described in the look-up table 26.

By performing transmission power control in the digital signal processing circuit 20, there is no need to separately place a circuit equivalent to the transmission power control unit 16. It is thereby possible to further suppress the circuit scale necessary for measuring the transmission power of the radio transmitting unit 11.

Third Exemplary Embodiment

Figure 4:
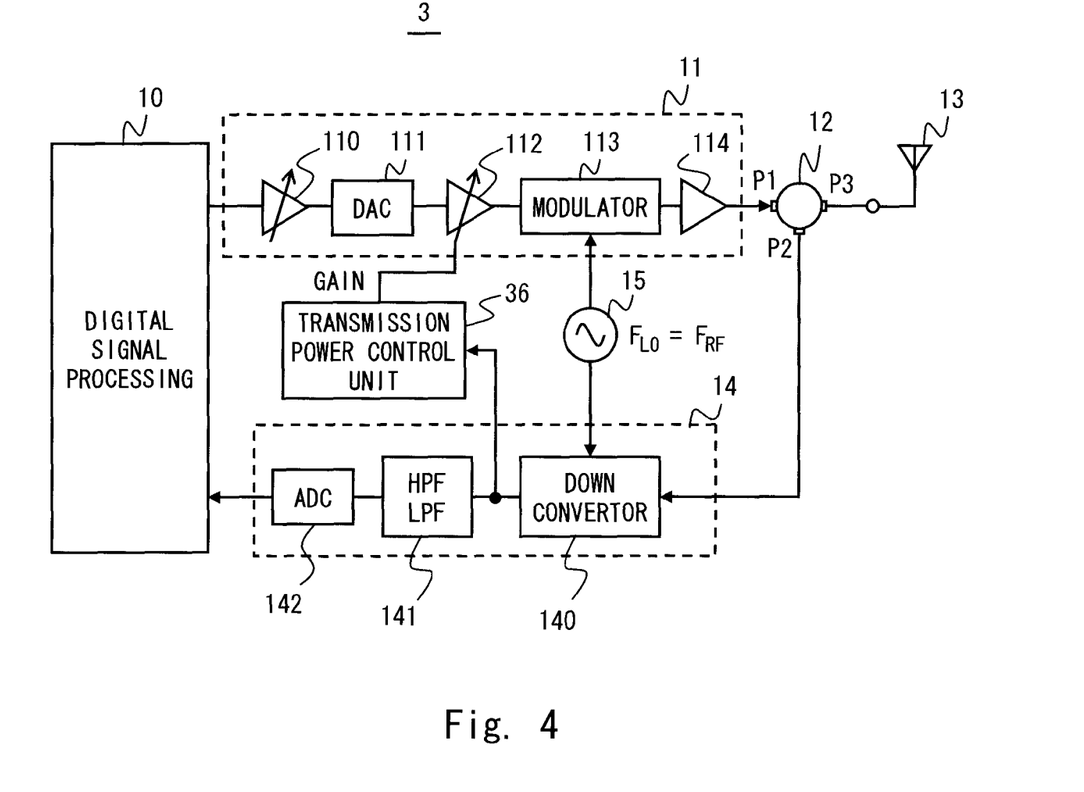
FIG. 4 is a block diagram showing a configuration of a radio communication device according to a third exemplary embodiment of the present invention.

FIG. 4 is a block diagram showing an exemplary configuration of a radio communication device 3 according to the third exemplary embodiment. In this exemplary embodiment, a transmission leakage signal output from the down converter 140 is supplied to a transmission power control unit 36 not through the ADC 142. As described above, the transmission leakage signal is a low-frequency signal that is obtained by down-converting the frequency of a leakage component of the transmission signal of the radio transmitting unit 11 to the radio receiving unit 14. The transmission power control unit 36 measures the power level of the transmission leakage signal and performs gain control of the radio transmitting unit 11 according to the measured level.

In the configuration of FIG. 4, at least the down converter 140 is used for both reception of a backscattered signal and measurement of a transmission leakage signal power, and it is thus possible to suppress the circuit scale necessary for measuring the transmission power of the radio transmitting unit 11.

Fourth Exemplary Embodiment

Figure 5:
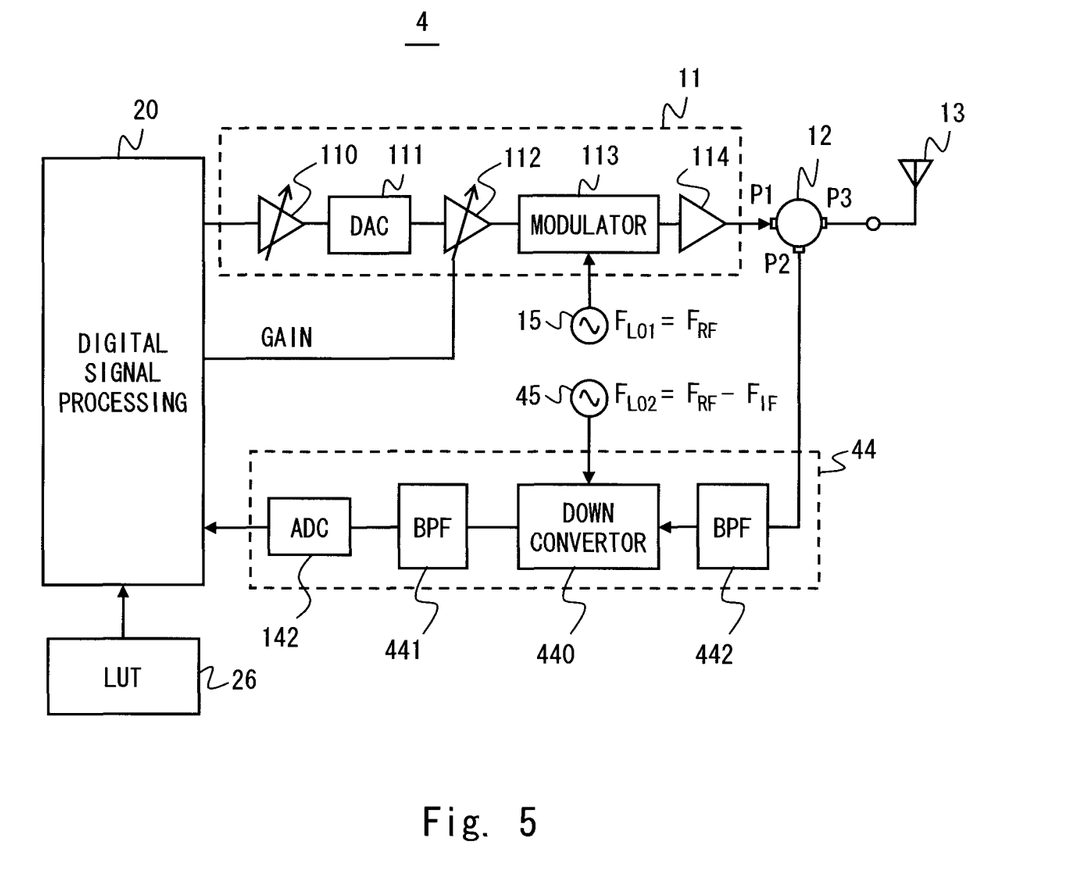
FIG. 5 is a block diagram showing a configuration of a radio communication device according to a fourth exemplary embodiment of the present invention.

FIG. 5 is a block diagram showing an exemplary configuration of a radio communication device 4 according to the fourth exemplary embodiment. A radio receiving unit 44 shown in FIG. 5 is a heterodyne receiver, and it down-converts a backscattered signal from a radio tag into the IF band.

A bandpass filter (BPF) 442 included in the radio receiving unit 44 is a filter for removing an image signal. A down converter 440 receives a local signal with a frequency which is deviated from a received carrier frequency $F_{RF}$ by the amount of an intermediate frequency $F_{IF}$ from a local oscillator 45 and performs down-conversion of a backscattered signal. The down-converted IF signal is transmitted to the ADC 142 through a BPF 441 for selecting the IF band.

In the case of heterodyne, the principal energy of a transmission leakage signal based on a non-modulated transmission carrier exists in other than DC. It is thus not necessary to perform bypass of the BPF 441 when measuring the power value of the transmission leakage signal.

The radio communication device 4 shown in FIG. 5 is described as an alternative example of the radio communication device 2 according to the second exemplary embodiment. However, the embodiment may be combined with the first or third exemplary embodiment. Specifically, in the configurations of the radio communication devices 1 and 3 described in the first and third exemplary embodiments of the invention, the radio receiving unit 14 may be replaced with a heterodyne receiver.

Further, although a passive RFID reader (reader/writer), which is one of preferred applications of the present invention, is described in the first to fourth exemplary embodiments of the invention, the application of the present invention is not limited to a passive RFID system as a matter of course.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A radio communication device comprising:
a radio transmitting unit that generates a transmission signal containing a transmission carrier;
a radio receiving unit including a frequency conversion circuit that performs frequency down-conversion of a received signal containing a received carrier with substantially the same frequency as the transmission carrier;
a transmission/reception separating circuit including a first port connected to the radio transmitting unit, a second port connected to the radio receiving unit and a third port connected to an antenna, that outputs the transmission signal input into the first port to the third port and outputs the received signal input into the third port to the second port; and
a transmission power control unit that performs control related to a transmission power of the transmission signal based on a low-frequency signal obtained by supplying a leakage component of the transmission signal leaking from the first port to the second port to the frequency conversion circuit and down-converting the leakage component, wherein
the radio receiving unit further includes:
an A/D conversion circuit that performs A/D conversion of the down-converted received signal, and
a high-pass filter that is placed between the frequency conversion circuit and the A/D conversion circuit and removes a direct-current component contained in an output of the frequency conversion circuit, and
the transmission power control unit enables the A/D conversion circuit to detect the direct-current component of the low-frequency signal by stopping removal of the direct-current component by the high-pass filter or bypassing the high-pass filter during execution of the control related to the transmission power.

2. The radio communication device according to claim 1, wherein
the received signal is a backscattered signal generated in a radio tag by modulating a reflected wave of the transmission signal, and
control related to the transmission power based on the leakage component is selectively performed during time not receiving the backscattered signal.

3. The radio communication device according to claim 1, wherein
the received signal is a backscattered signal transmitted from a radio tag having received the transmission signal containing a command for prompting the radio tag to perform transmission, and
the control related to the transmission power based on the leakage component is performed during a period when transmission of the command is stopped.

4. The radio communication device according to claim 1, wherein
the A/D conversion circuit converts the low-frequency signal into a digital value by sampling, and
the transmission power control unit performs control related to the transmission power based on the digital value.

5. The radio communication device according to claim 4, wherein
the transmission power control unit includes a digital signal processing circuit, and
the digital signal processing circuit executes generation of a transmission symbol sequence for modulating the transmission carrier and analysis of the received signal digitized by the A/D conversion circuit in addition to adjustment of the transmission power.

6. The radio communication device according to claim 1, wherein the transmission/reception separating circuit includes at least one of a directional coupler and a circulator.

7. The radio communication device according to claim 1, wherein control related to the transmission power includes at least one of acquiring a measured value related to the transmission power and controlling a gain of the transmission signal.

8. The radio communication device according to claim 1, wherein the transmission power control unit controls the transmission power based on a look-up table where a measured value related to the low-frequency signal and the transmission power of the transmission signal are associated in advance.

9. A transmission power measurement method of a radio communication device comprising steps of:
(a) supplying a leakage component of a transmission signal, leaking from a radio transmitting unit side to a radio receiving unit side through a transmission/reception separating circuit placed among (i) a radio transmitting unit that performs modulation of the transmission signal, (ii) a radio receiving unit that performs frequency down-conversion of a received signal containing a received carrier with substantially the same frequency as a transmission carrier contained in the transmission signal, and (iii) an antenna that is used both for transmission of the transmission signal and reception of the received signal, to the radio receiving unit and performing frequency down-conversion of the leakage component; and
(b) acquiring a measured value related to a transmission power of the transmission signal based on a low-frequency signal obtained by frequency down-conversion of the leakage component, wherein
the radio receiving unit includes:
a frequency conversion circuit that performs the frequency down-conversion of the received signal,
an A/D conversion circuit that generates a received data sequence by performing A/D conversion of the down-converted received signal, and
a high-pass filter that is placed between the frequency conversion circuit and the A/D conversion circuit and removes a direct-current component contained in an output of the frequency conversion circuit, and
the method further comprises:
(c) enabling the A/D conversion circuit to detect the direct-current component of the low-frequency signal by stopping removal of the direct-current component by the high-pass filter or bypassing the high-pass filter during acquisition of a measured value related to the transmission power.

10. The method according to claim 9, wherein
the received signal is a backscattered signal generated in a radio tag by modulating a reflected wave of the transmission signal, and
acquisition of a measured value related to the transmission power based on the leakage component is selectively performed during time not receiving the backscattered signal.

11. The method according to claim 9, wherein
the received signal is a backscattered signal transmitted from a radio tag having received the transmission signal containing a command for prompting the radio tag to perform transmission, and
acquisition of a measured value related to the transmission power based on the leakage component is performed during a period when transmission of the command is stopped.

* * * * *